Figure 1:
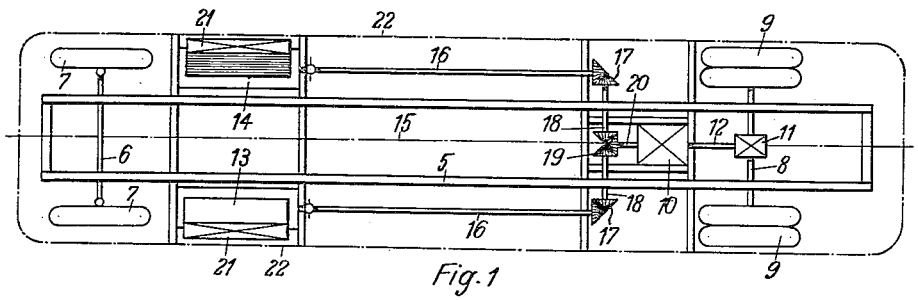

May 15, 1956

F. K. H. NALLINGER 2,745,505

ARRANGEMENT OF THE DRIVING GEAR OF MOTOR
VEHICLES, IN PARTICULAR OF OMNIBUSES

Filed June 6, 1950

Inventor
Friedrich K. H. Nallinger
By Dicke and Padlon
attorneys

United States Patent Office 2,745,505
Patented May 15, 1956

2,745,505

ARRANGEMENT OF THE DRIVING GEAR OF MOTOR VEHICLES, IN PARTICULAR OF OMNIBUSES

Friedrich K. H. Nallinger, Stuttgart, Germany, assignor to Daimler-Benz Aktiengesellschaft, Stuttgart-Unterturkheim, Germany Application June 6, 1950, Serial No. 166,360

Claims priority, application Germany June 25, 1949

1 Claim. (Cl. 180—54)

The present invention relates to an arrangement of the driving gear of motor vehicles, particularly in omnibuses wherein one or several vehicle axles are driven by two driving engines.

It is an object of the present invention to arrange the driving gear at the vehicle in such a manner that a good utilization of space and distribution of weight results therefrom. Another object is concerned with favorable possibilities of mounting for attendance. Furthermore it is another object of the present invention to provide a power transmission to the driven vehicle axles with the least possible loss.

It is therefore an essential characteristic of the present invention that on each side of the vehicle, one driving engine each is arranged in a longitudinal direction between the front and rear wheels, i. e. each is near one of the wheels of the vehicle. Thereby either or both engines can be arranged directly behind the front wheels, or directly in front of the back wheels; or one engine can be accommodated on one of the sides behind the front wheel and the second engine on the other side of the vehicle in front of the back wheel.

Further characteristics of the present invention consist of an arrangement of the engines, which is parallel to the longitudinal axis of the vehicle. A particularly favorable power transmission results, if, as seen from above, the two engines with their longitudinal axes are arranged inclined to the longitudinal axis of the vehicle, in such a manner that the power transmission from the driving engines to the driven wheels can be executed through only one joining or cross-shaft gear. It is a further characteristic of the present invention that a common change gear is adjoined to both engines. In accordance with another characteristic of the present invention the driving engines are purposefully built in with the central longitudinal plane of each engine forming an acute angle with respect to the vertical and with their cylinder heads inclined towards the outside, in order to make them easily accessible from the outside for attendance and repair work.

The drawing shows in diagrammatic plan view in Figures 1 to 4, four examples of construction of the invention.

In the drawings, 5 indicates the frame or chassis of the vehicle including two essentially longitudinal frame members, 6 the front axle of the vehicle with the steering wheels 7, 8 the driven rear axle with the driving wheels 9, 10 the change speed gear and 11 the differential gear at the rear axle.

The gears 10 and 11 are connected with each other by an intermediate shaft 12, which can be formed as a cardan shaft, as the occasion may arise. Of the two driving engines the left one is marked with 13 and the right one with 14. In Figure 1 one driving engine each is arranged on each side of the vehicle directly behind the front wheels parallel to the longitudinal vehicle axis 15. The power of each of the two engines is transmitted by one intermediate or drive shaft 16, a bevel cross-shaft gear 17 and an intermediate shaft 18, to another cross-shaft gear 19, from which the power transmission for both engines is jointly effected by an intermediate shaft 20 to the change speed gear 10 and from there further through the intermediate shaft 12 to the differential gear 11 and therewith to the rear axle.

Figure 2:
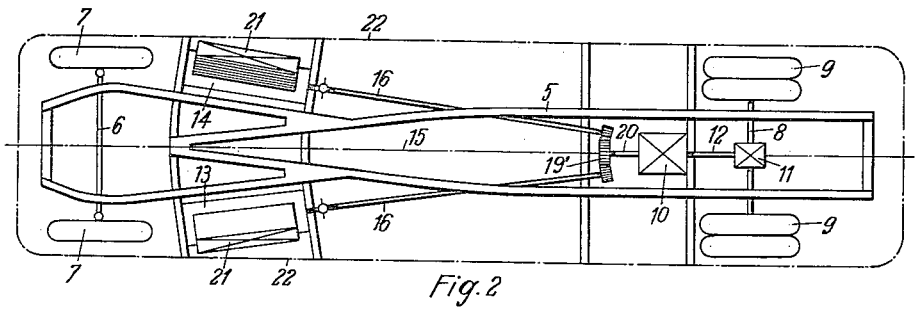

In the example of construction of Figure 2 both driving engines are also arranged directly behind the front wheels in the longitudinal direction, this time, however, with their longitudinal axes inclined to the vehicle longitudinal axis 15, so that the two intermediate or drive shafts 16 come together in the gear 19' and thereby the two cross-shaft gears 17 and the intermediate shafts 18 of Figure 1 are not necessary. From the gear 19' the further power transmission takes place in the same manner as indicated above for the first example of construction.

Figure 3:
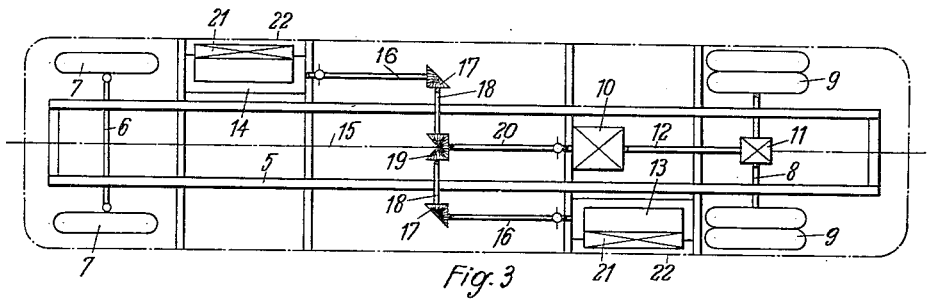

In Figure 3 the right driving engine 14 is arranged closely behind the front wheel, the left driving engine closely in front of the rear wheel of the respective side of the engine. The drive shafts 16 and the intermediate shafts 18, 20 and 12, as well as the cross-shaft gears 17, 19, the speed change gear 10 and the differential gear 11 serve again for the transmission of power to the rear axle 8 in the same manner as in Figure 1.

Figure 4:
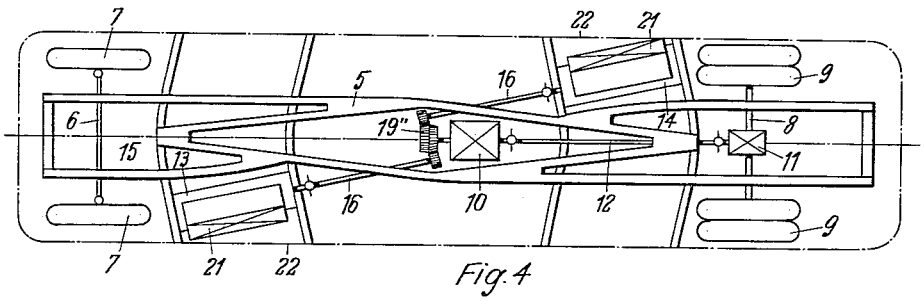

In the embodiment shown in Figure 4, the left driving engine 13, as viewed in the drawing, is arranged directly behind the front wheels 7 and the right driving engine 14 is arranged directly in front of the back wheels 9. The two driving engines 13 and 14 are located on opposite sides of the vehicle and are inclined with respect to the longitudinal axis 15 of the vehicle so that the two intermediate or drive shafts 16 connecting the two driving engines with the double gear 19", extend substantially parallel in the direction of the double gear 19" from which the further transmission of power to the back wheels 9 takes place in the manner, which is described above in connection with Figure 2.

Within the scope of the present invention also both engines can be arranged closely in front of the back wheels of the vehicle, lying parallel or inclined to the longitudinal axis of the vehicle. The flow of power then takes for both engines the course, which is indicated in Figure 3 for the left engine, or in Figure 4 for the right engine.

Which of the above described forms of construction is selected in the individual case, depends to a great extent upon the requirements, which are given by the buyer with respect to the location of the entrance doors, or result from the specific purpose of utilization of the car body. The arrangement of the driving gear in accordance with the invention permits in that respect the widest scope under retention of its fundamental advantages, which are mentioned in the beginning of this specification.

As can be seen in the drawing, the driving engines 13, 14 which are located outside the two longitudinal frame members are built-in close to the contours of the outer body wall 22, indicated in dash and dotted lines, and inclined with the central longitudinal plane of each engine forming an acute angle with respect to the vertical and with their cylinder heads inclined towards the outside, so that their upper end, in particular the cylinder head 21, is located as close as possible to the contours of the outer body wall 22 of the car body. Through openings in the wall 22, which are dimensioned accordingly and can be closed by latches, the attendance and repair work at the cylinder heads, for example at the ignition, at the fuel supply and at the valve mechanism, which become frequently necessary, can be carried out particularly conveniently in this case, and, as the occasion may arise, also the cylinder heads or the entire driving engine can be removed for repair. The space above the engines, which are suspended as low at the vehicle frame as possible, can be very well utilized for accommodation of a longitudinal seat or bench, which forms an integral prolongation of the longitudinal bench, which is necessary anyhow in that place because of the wheel boxes for the front and back wheels.

The invention is not restricted to the illustrated examples of construction, but can be varied at random within the scope of the ideas of the invention, as claimed.

What I claim is:

In a motor vehicle, a frame including two spaced longitudinal frame members for said vehicle, a pair of front wheels, a pair of rear wheels, a pair of driving engines including a drive shaft for each engine, one of said engines being disposed on one side of the vehicle outside said frame close to the contours of the outer body walls of the vehicle and immediately behind one of the front wheels, the other of said engines being disposed on the other side of the vehicle outside said frame close to the contours of the outer body walls of the vehicle and immediately in front of one of said rear wheels, both engines with their drive shafts extending toward the center of the vehicle in substantially parallel relationship, a common change-gear located in the longitudinal central plane of the vehicle intermediate said two spaced frame members, means for operatively connecting said drive shafts with said change-gear, and means for transmitting the drive from said change-gear to said rear wheels, said driving engines being inclined with the central longitudinal plane of each engine forming an acute angle with respect to the vertical and with their cylinder heads inclined toward the outside of the vehicle to provide for greater accessibility.

References Cited in the file of this patent

UNITED STATES PATENTS

| | | |
|---|---|---|
| 851,540 | Martin | Apr. 23, 1907 |
| 1,317,841 | Ware | Oct. 7, 1919 |
| 1,775,754 | Fageol | Sept. 16, 1930 |
| 1,863,972 | Eckland | June 21, 1932 |
| 1,906,708 | Morgan | May 2, 1933 |
| 2,132,450 | Wolf | Oct. 11, 1938 |
| 2,257,772 | Wolf | Oct. 7, 1941 |
| 2,317,324 | Wolf | Apr. 20, 1943 |
| 2,380,889 | Waseige | July 31, 1945 |
| 2,416,128 | Swennes | Feb. 18, 1947 |
| 2,536,560 | Limon | Jan. 2, 1951 |

FOREIGN PATENTS

| | | |
|---|---|---|
| 154,981 | Great Britain | Dec. 2, 1920 |
| 53,724 | Norway | Mar. 26, 1934 |